United States Patent [19]

Kohama et al.

[11] Patent Number: 4,660,401

[45] Date of Patent: Apr. 28, 1987

[54] APPARATUS FOR PRODUCING BEARINGS IN THE FORM OF PRESS WORKED BUSH

[75] Inventors: Masayuki Kohama, Moriyama; Tatsuro Wakabayashi; Koichi Tsunoda, both of Shiga, all of Japan

[73] Assignee: Oiles Industry Co., Ltd., Tokyo, Japan

[21] Appl. No.: 849,067

[22] Filed: Apr. 7, 1986

Related U.S. Application Data

[62] Division of Ser. No. 674,697, Nov. 26, 1984, abandoned.

[30] Foreign Application Priority Data

Nov. 30, 1983 [JP] Japan ............................... 58-226294

[51] Int. Cl.[4] ............................................. B21D 53/10

[52] U.S. Cl. ....................................... 72/331; 72/338; 72/370; 72/402; 83/862; 83/387; 83/460; 83/694; 29/149.5 DP; 29/149.55; 29/149.5 C

[58] Field of Search .......... 72/324, 330, 331, 337-339, 72/402; 83/862, 387, 389, 388, 386, 382, 460, 694; 29/149.5 DP, 149.5 S, 149.5 R, 149.4 R, 417, 413, 149.5 C

[56] References Cited

U.S. PATENT DOCUMENTS

| | | | |
|---|---|---|---|
| 2,761,378 | 9/1956 | Lancaster | 83/386 |
| 3,166,827 | 1/1965 | Bushi . | |
| 3,227,024 | 1/1966 | Krebs | 83/694 |
| 3,262,299 | 7/1966 | Hart et al. . | |
| 3,461,708 | 8/1969 | Pepe . | |
| 4,041,821 | 8/1977 | Galter | 83/382 |
| 4,083,221 | 4/1978 | Whitted | 72/370 |
| 4,292,718 | 10/1981 | Iijima | 72/331 |

FOREIGN PATENT DOCUMENTS

| | | | |
|---|---|---|---|
| 624963 | 1/1936 | Fed. Rep. of Germany | 72/394 |
| 834561 | 3/1952 | Fed. Rep. of Germany | 72/402 |
| 469263 | 2/1952 | Italy . | |
| 759186 | 5/1978 | U.S.S.R. . | |
| 774829 | 10/1980 | U.S.S.R. | 83/694 |

*Primary Examiner*—Daniel C. Crane

*Attorney, Agent, or Firm*—Oldham, Oldham & Weber Co.

[57] ABSTRACT

An useful method of producing a lot of bearings in the form of a press worked bush is initiated with production of blanks having four corner edges chamfered. In the notch forming and cutting die section comprising upper and lower die halves a strip of metallic material that is called hoop is pressed stepwise to form a plurality of V-shaped notches of which depth increases stepwise toward the outlet of the die section. On completion of forming of notches the hoop is cut off at the center of the last V-shaped notch with the aid of a pair of cutting tools. The die assembly usable for carrying out the method includes an U-bending die section and a circle bending die section which are located in series. After leaving the notch forming and cutting die section a blank is introduced into the U-bending die section by utilizing feeding movement of the hoop of the notch forming and cutting die section and thus U-bent blank is subjected to final circular bending in the circle bending die section also by utilizing feeding movement of the hoop. No feeding device is required in each of the press working steps.

7 Claims, 21 Drawing Figures

APPARATUS FOR PRODUCING BEARINGS IN THE FORM OF PRESS WORKED BUSH

CROSS-REFERENCE

This is a division of application Ser. No. 674,697, filed Nov. 26, 1984, now abandoned.

BACKGROUND OF THE INVENTION

1. Field of the Invention

The present invention relates to a method of producing a lot of blanks usable for producing bearings in the form of a press worked bush. The present invention relates also to a method of producing a lot of bearings in the form of a press worked bush using thus produced blanks. Further, the present invention relates to a notch forming and cutting die for producing blanks as well as a die assembly including the aforesaid notch forming and cutting die.

More particularly, the present invention relates to a method of producing a lot of blanks usable for bearings in the form of a press worked bush (hereinafter referred to simply as bush) which has four corner edges chamfered so to assure that no chamfering operation is required after completion of production of bush bearings as well as a cutting die employable for producing blanks of the abovementioned type. Further, the present invention relates to a method of producing a lot of bush bearings of the type having four circular corner edges chamfered, the method including the steps of feeding a strip of metallic material having a predetermined width to a die assembly, forming a plurality of V-shaped notches on both the surfaces of material, the notches on the one surface of material being located in alignment with those on the other surface thereof, cutting off material at the joint area where the adjacent blanks are jointed to one another via the final V-shaped notch, bending thus obtained blank to the U-shaped configuration and then bending it to the circular configuration, wherein press working in each of the steps is achieved on a single straight line by simultaneous die closing and opening operation without any interruption. Moreover, the present invention relates also to a die assembly employable for carrying out the foregoing method of producing bush bearings.

2. Description of the Prior Art

Chamfered portion on the end face of a cylindrical bearing comprising bush press worked by press machine is generally prepared usually by machining operation for the following purposes.

1. to inhibit occurrence of local contact with the opponent shaft member,
2. to assure that the bearing is brought in proper sliding contact with the opponent shaft member,
3. to make it easy to fit the opponent shaft member to the bearing,
4. to make it easy to press fit the bearing to a housing,
5. to inhibit occurrence of malfunction relative to routine handling due to existence of shaft corner (edge portion) or the like.

Size and configuration of chamfered portion are specially determined in some case in dependence on its purpose but it is generally prepared in consideration of thickness and diameter of the bearing. Usually, larger and thicker bearing has wider chamfered portion and smaller and thinner bearing has narrower chamfered portion. As is widely known, chamfered portion is formed by cutting corner edge by an inclination angle of 45 degrees. When the chamfered portion has a length of 1 mm, it is represented by a symbol of 1C and when it has 2 mm, it is represented by a symbol of 2C. The end face of a chamfered bearing bush is constituted by two inclined faces at both the inner and outer circular corner edges and a flat end face extending at a right angle relative to the axis line of the bush.

Bearing bush made of metallic material such as cast copper alloy or the like is usually subjected to chamfering around both the inner and outer circular corner edges at the same time when finish machining is carried out by lathing or the like. On the other hand, in case of bush bearing made of metallic piece by press working particularly when it has a smaller diameter, thing is different because of the fact that machining is complicated and takes long time. Namely, chamfering is not effected after a product of bush is obtained but it is effected during production of blank. This type of method was already recognized as a very advantageous method and it was put in practical use.

In connection with this method the inventors invented blanks usable particularly for producing a lot of press worked bushes having a smaller diameter, each of the blanks being such that it had no flat end face but the end part was constituted by a combination of inclined faces, as well as a cutting die for producing these blanks. According to the prior invention it was found that particularly in case bearing bushes having a smaller diameter the object of chamfering was satisfactorily accomplished by inclined end faces and therefore no inconvenience was experienced when they were used practically. However, the conventional press worked bushes failed to meet requirement for flat end face mainly from the viewpoint of appearance particularly in case of a larger diameter.

SUMMARY OF THE INVENTION

To obviate the foregoing problem the inventors conducted a variety of research and development works and succeeded in obtaining chamfered blanks employable for producing bearings in the form of a press worked bush of which end part is constituted by inclined faces and a flat end face located therebetween. Specifically, there has been provided a method of producing a lot of blanks usable for producing bearings in the form of a press worked bush, each of the blanks being such that its end part is constituted by two chamfered faces and a flat end faces located therebetween and extending at a right angle relative to the outer surface of hoop, each of the chamfered faces being formed by one half of a V-shaped groove, wherein the method is carried out by way of the steps of feeding hoop to a notch forming and cutting die by a distance equal to the height of a bush, closing the die to press a plurality of V-shaped notches extending in the lateral direction of feeding of the hoop on both the surfaces of the latter by means of a plurality of projections having the triangular cross-sectional configuration, the height of the projections being determined to increase stepwise toward the outlet of the die, repeating the above-mentioned steps until the final V-shaped notch reaches a required depth and cutting off the hoop at the joint area where the notch forming die section is jointed to the cutting die section with the aid of cutting tools at the same time when die closing is effected.

Various kinds of metallic materials such as copper alloy, aluminum alloy and steel of which surface is treated suitably for the purpose of self-lubrication, wear proofness or the like are employable as hoop for production of blanks. Required blanks are formed by way of the steps of feeding to the die by a predetermined distance a strip of metallic material (hoop) having a width which is determined so as to produce bush bearings having a predetermined diameter, pressing a plurality of V-shaped notches in the above-described manner and cutting thus notch formed hoop with corner edges chamfered as required. Blanks thus produced have a width (equal to the distance of feeding) which is determined equal to the height of bush bearings.

The reason why a plurality of V-shaped notches are formed on both the surfaces of hoop prior to cutting consists in utilizing the inclined faces of V-shaped notch as chamfered face on a product of bush bearing. Further, the reason why the depth of V-shaped notches increases stepwise consists in keeping blank in the unstressed state, inhibiting the surfaces from being damaged and preventing die from being injured. For instance, when all V-shaped notches having a predetermined depth are formed merely by a single step of press working and blank is cut off, a product of blank has residual stress. If a bush is produced using thus obtained blank as raw material in case where high accuracy on order of $3\times10^{-2}$ mm is required, it results that there occurs dimensional fluctuation in inner and outer diameters of bush and it becomes difficult to maintain accuracy of a product of bush. Particularly in case of hoop having the composite structure including plural overlaid layers jointed one above another at lower mechanical strength there often occurs such a problem that the overlaid structure is damaged or injured at the position located in the proximity of the chamfered faces.

However, according to the method of the invention arrangement is made such that a plurality of V-shaped notches have a depth which increases stepwise toward the outlet of the die and cutting of the notch formed hoop is carried out when the final V-shaped notch reaches a predetermined depth. Thus, the foregoing problems including a problem of dimensional accuracy due to warpage of blank can be resolved substantially.

In a typical embodiment of the invention the V-shaped notches are formed on both the surfaces of hoop in such a manner that the notches on the lower surface are located in vertical alignment with those on the upper surface of hoop and the former have the same depth as that of the latter. Alternatively, modification may be made such that a depth of V-shaped notches on both the surfaces of hoop increases alternately toward the outlet of the die and they have the same depth at the position where the final V-shaped notch is formed.

According to the modified method of the invention the inclined faces on a V-shaped notch to serve as chamfered face on bearing bush can be beautifully finished at a higher dimentional accuracy and therefore it can be advantageously employable particularly in case where hoop is used as raw material which has the composite structure including plural overlaid soft layers serving as layer of sliding surface.

Further, in case where a plurality of V-shaped notches are formed on hoop having the composite structure including plural overlaid layers in the above-described manner, the method of the invention should not be limited to the arrangement that the first shallowest V-shaped notch on the lower surface of hoop is located in vertical alignment with that on the upper surface of the same. Alternatively, modification may be made such that a V-shaped notch is formed on the overlaid side of hoop with no V-shaped notch being formed on the other side and then a depth of V-shaped notches increases alternately toward the outlet of the die in accordance with the above-described method.

Generally, feeding of hoop (that is, closing of the die) is carried out by at least two times, preferably more than three times until the final V-shaped notches on both the upper and lower surfaces of hoop reach the maximum depth. In case where hoop having the composite structure is used as raw material, feeding is carried out by at least three times, preferably more than four times.

After completion of forming of V-shaped notches in that way thus notch formed hoop is cut off at the center of the final V-shaped notch by means of cutting tools in the joint area where the notch forming die section is jointed to the cutting die section. A required blank is constituted by a piece cut from the hoop.

Next, description will be made below as to a notch forming and cutting die of the invention.

An upper die section constituting the die of the invention is constructed by an upper V-shaped notch forming die half with a plurality of projections having the triangular cross-sectional configuration formed on the lower surface thereof, an upper cutting tool attached to the upper V-shaped notch forming die half, an upper depressing die half disposed in sliding contact with the upper cutting tool and spring means disposed on the upper surface of the upper depressing die half.

On the other hand, a lower die section constituting the die of the invention is constructed by a lower V-shaped notch forming die half with a plurality of projections having the triangular cross-sectional configuration formed on the upper surface thereof, the projections being located opposite to those on the upper V-shaped notch forming die half, a supporting plate for resiliently supporting the lower V-shaped notch forming die half on the upper surface thereof with spring means disposed therebetween and a lower depressing die half disposed in sliding contact with the lower V-shaped notch forming die half to guide movement of the latter, the lower depressing die half being fixedly secured to the supporting plate at the position located opposite to the upper depressing die half and having a lower cutting tool attached to the upper corner edge thereof.

Each of the projections for forming V-shaped notch on hoop is generally designed to have an inclination angle of 45 degrees relative to the flat surface of the die. It may have an inclination angle different from the foregoing one, if necessary. When the inclined face of a projection is caused to continuously extend from the flat surface of the die along the concave configuration, it results that both the outer and inner wall surfaces on a bush are smoothly jointed to one another via the chamfered faces having the round configuration. This is preferably employable for bushes usable for bearing.

Projections on both the upper and lower V-shaped notch forming die halves are provided in the equally spaced relation by two pairs, preferably more than three pairs and their height is determined to increase stepwise toward cutting tools at the end of the notch forming die section. The distance between adjacent projections is dimensioned equal to the height of a product of press worked bush and corresponds to the length of feeding of hoop.

Further, the maximum height of projections is determined less than 2/5 of the thickness of hoop to be introduced into the die. Usually, it is equal to about ⅓ of the thickness of hoop. This means that when V-shaped notches are formed in vertical alignment on both the surfaces of hoop, the joint area in hoop has still the thickness more than 1/5 of the thickness of hoop, normally more than $\frac{1}{3}$ of the same.

The present invention should not be limited only to the embodiment where two or more than three pair of projections having the triangular cross-sectional configuration are provided in the oppositely located relation on hoop. Alternatively, a single projection having the triangular cross-sectional configuration to serve for forming the first V-shaped notch may be provided on the one side of hoop at the inlet area of the die without any opponent projection being formed on the other side of the same.

Object and advantage of arrangement of a single projection made in this way is as described in the previous paragraph with respect to production of blanks with the use of hoop having the composite structure. This modified embodiment of the invention is identical to the foregoing one in respect of the fact that the single projection has the lowest height and a height of other projections is determined to increase stepwise toward the cutting die section. It should be noted that projections employable for the method where the depth of V-shaped notches on both the surfaces of hoop is determined to increase alternately toward the cutting die section are arranged such that a plurality of groups each of which comprises two projections having the same height are alternately located while their height increases stepwise toward the cutting die section.

Namely, when after V-shaped notches are pressed by a certain depth on the one surface of hoop, V-shaped notches are pressed on the other surface of the same or they are pressed to increase their depth, the V-shaped notches on the one surface of hoop are displaced so as to allow the next group of projections having the same height to be fitted thereto while no pressing is effected on the other surface of hoop.

When the die of the above-described type is used, there is necessity for increased number of projections having the triangular cross-sectional configuration in comparison with the die in which V-shaped notches are formed in the oppositely located relation on both the surfaces of hoop and pressing is carried out to simultaneously increase their depth. However, it has an advantageous feature that blanks having corner edges chamfered at high accuracy are obtainable.

Cutting tool attached to the die is usually made of hard metal or the like material in a special factory and it is fixedly secured thereto. Alternatively, corner edge of the die itself may function as cutting tool. The geometrical configuration of cutting edge at the extreme end of the cutting tool is designed to have an edge angle equal to half of the top angle of projection and protrude by a distance equal to the highest height of the projections above the surface of the die. Alternatively, the one corner edge of the die having an angle of 90 degrees may be utilized as cutting tool (in this case no protrusion is recognized from the surface of the die). Further, a combination of cutting tools of two types as described above may be employed.

When hoop to be introduced into die has a thinner thickness, cutting operation can be performed without any particular problem by utilizing corner edges of the die itself as cutting tool, each of the corner edges having a corner angle of 90 degrees. However, when hoop has a thicker thickness, upper and lower cutting tools are employable which have a cutting edge angle equal to half of the top angle of projections as described above. Alternatively, a combination of cutting tool having a corner angle of 90 degrees and cutting tool having an edge angle equal to half of the top angle of projections may be employed.

Spring means disposed on the upper surface of the upper depressing die half and those interposed between the lower V-shaped notch forming die half and the supporting plate is generally constituted by coil spring, rubber or the like resilient material.

Further, the present invention relates to a method of producing a lot of bush bearings of the type having four circular corner edges chamfered, the method including the steps of feeding a strip of metallic material having a predetermined width to a die assembly including a notch forming and cutting die section, an U-bending die section and a circle bending die section, forming a plurality of V-shaped notches on both the surfaces of material, cutting off material at the joint area where the adjacent blanks are jointed to one another via the final V-shaped notch, displacing thus obtained blank to the U-bending die section by utilization of feeding movement of material, bending it to the U-shaped configuration, displacing thus U-bent blank to the circle bending die section by utilization of thrusting movement of the subsequent work, bending it to the circular configuration and then discharging thus circle bent bush outwardly of the die assembly, wherein operation in each of the steps is achieved on a single straight line by simultaneous die closing and opening movement without any interruption. Further, the present invention relates also a die assembly employable for carrying out the foregoing method of producing bush bearings.

According to the invention a strip of metallic material (hoop) having a predetermined width is first prepared at a high accuracy. Hoop is then introduced into the V-shaped notch forming die section with a plurality of projections having the triangular cross-sectional configuration formed in the oppositely located relation thereon by a distance equal to the height of a product of press worked bush and thereafter die closing is effected to press a plurality of V-shaped notches extending at a right angle relative to the direction of feeding of the hoop. After completion of die opening hoop is displaced forwardly further by the same distance as above-noted one and die closing is then effected again to press the V-shaped notches to an increased depth by means of the projections having an increased height. After the V-shaped notches reach a predetermined depth on hoop in that way, it is cut off at the joint area where adjacent blanks are jointed to one another via the final V-shaped notch in the cutting die section while the die assembly is kept closed. As a result, a blank including four chamfered corner edges constituted by inclined faces of V-shaped notch and flat end faces extending between adjacent chamfered corner edges at a right angle relative to the surface of hoop is obtained. It should be noted that the above-described steps are quitely same to those in the foregoing method of producing a lot of blanks usable for producing bearing bushes. On completion of cutting operation a blank is thrusted forward by a predetermined distance by utilizing feeding movement of hoop to enter the U-bending die section. At this moment the foremost end of hoop has reached the cutting die section.

As the die assembly is closed, the blank is bent to the U-shaped configuration and at the same time the fore end part of hoop is cut off to produce another blank. After completion of die opening thus obtained blank is thrusted forward to the U-bending die section to bend it to the U-shaped configuration and it is then displaced forward further to the circle bending die section.

Specifically, thus U-bent blank is bent to the circular configuration when the die assembly is closed, while the above-described steps of press working are carried out in other die sections. On completion of the circular bending operation a product of bush is thrusted outwardly of the die assembly which has been opened by utilizing feeding movement of hoop. As a result, required press worked blanks having corner edges chamfered are produced one by one.

A strip of metallic material that is called hoop to be in use for carrying out the method of the invention is as described above. Namely, it is displaced forward by a predetermined distance of feeding step by step and after the final V-shaped notch reaches the maximum depth, it is cut off at the joint area where the adjacent blanks are jointed to one another via the final V-shaped notch by means of cutting tools while the die assembly is held in the closed state whereby a required blank is obtained.

Typically, the step of U-bending is accomplished by one operation so that U-bent blank is obtained. However, from the viewpoints of improved dimensional accuracy of U-bent blank, improved dimensional accuracy of product of bearing in the form of press worked brush, reduced occurrence of injury or damage on the surfaces of blank due to friction existent between blank and die assembly and inhibition of wearing of die assembly it is advantageously acceptable to divide U-bending operation into two steps.

It is preferable to change the direction of pressing operation on blank separately for the first and second steps of operations.

In the first step of U-bending operation blank is roughly bent to the U-shaped configuration having predetermined dimensions merely by simple U-bending and it is then displaced forward to the next position where another U-bending die section is disposed. In the second step of U-bending operation pressing force is exerted on the roughly U-bent blank in the different direction from that in the first step in order to eliminate spring-back function of the blank. As a result increased dimensional accuracy of the latter is obtained. Alternatively, both the ends of the blank to serve as butting end in press worked bush later may be tapered in the second step of U-bending operation. As modification from the foregoing embodiment tapering operation may be performed in advance in the first step of U-bending operation. In this case the second step is carried out for the purpose of increased dimensional accuracy. However, from the viewpoint of inhibiting the die assembly from being excessively loaded it is recommendable to perform tapering operation in the second step of U-bending operation with comparatively lower load.

The step of circle bending subsequent to the step of U-bending is generally achieved by a single operation to obtain a product of press worked bush. It is preferably employable to divide circle bending operation into two steps each of which is carried out in the different direction.

When circle bending is achieved by way of two steps, it results in improved dimensional accuracy of a product of press worked bush, for instance, improved circularity.

In both the steps of U-bending and circle bending operations pressing is first effected in the horizontal direction at a right angle relative to that of die closing, that is, in the lateral direction along the surface of blank and it is then effected in the direction of closing of the die assembly. To feed a strip of metallic material (hoop) to the die assembly by a predetermined distance there is usually arranged a feeding apparatus (for instance, pneumatic feeder) between coil and press machine. In general, it is possible to feed hoop at an accuracy higher than $1\times10^{-1}$ mm using such a kind of feeding apparatus.

Next, description will be made below as to a die assembly of the invention. The die assembly of the invention essentially comprises a V-shaped notch forming die section, a cutting die section, an U-bending die section and a circle bending die section each of which is arranged in series on a single straight line extending in the direction of feeding of hoop and functions when the upper die section is closed on the lower die section.

Specifically, the V-shaped notch forming die section includes an upper V-shaped notch forming die half with a plurality of projections having the triangular cross-sectional configuration formed on the lower surface thereof and a lower V-shaped notch forming die half with a plurality of projection having the triangular cross-sectional configuration formed on the upper surface thereof in vertical alignment with those on the upper V-shaped notch forming die half. This upper V-shaped notch forming die half is fixedly secured directly to the upper board of the die assembly or a mounting plate interposed between the upper half and the upper board.

On the other hand, the lower V-shaped notch forming die half is resiliently mounted in the oppositely located relation relative to the upper half on the lower board of the die assembly or an anvil plate interposed between the lower board and the lower half with the aid of spring means disposed below the latter. This lower V-shaped notch forming die half is immovably held in the lateral direction but can move by a short distance in the vertical direction (downwardly toward the lower board against resilient force of spring means. Usually, the projections having the triangular cross-sectional configuration to press a plurality of V-shaped notches on hoop are provided to have an inclination angle of 45 degrees relative to the flat surface of the V-shaped notch forming die section. Alternatively, they may have a different inclination angle other than 45 degrees, if necessary. When the inclined face of the projection is jointed to the flat surface of the die section by way of smooth configuration, it results that both the inner and outer cylindrical wall surfaces of a bush are jointed to one another via the smoothly chamfered corner edges. This is preferably acceptable for bushes usable for bearing.

The projections having the triangular cross-sectional configuration are as described above. Therefore, repeated description will not be required.

The cutting die section includes an upper cutting tool, an upper depressing die half, a lower cutting tool and a lower depressing die half. The upper cutting tool is attached to the upper V-shaped notch forming die half and the upper depressing die half is resiliently secured to the upper board of the die assembly with spring means interposed therebetween while it comes in sliding contact with the upper cutting tool. This upper derpressing die half is immovably held in the lateral direction but can move by a short distance in the vertical direction (upwardly toward the upper board) against resilient force of spring means. This lower depressing die half is fixedly secured to the lower board of the die assembly in the oppositely located relation relative to the upper depressing die half while it comes in sliding contact with the lower V-shaped notch forming die half. The lower cutting tool is attached to the upper corner edge area of the lower depressing die half where the latter comes in sliding contact with the lower V-shaped notch forming die half whereby the cutting die section is constituted by a combination of both the upper and lower cutting tools.

Usually, each of the upper and lower cutting tools is made of hard metal or the like metallic material in a special factory and it is fixedly secured to the upper and lower V-shaped notch forming die halves later. Alternatively, die halves themselves may be made of hard metal or the like metallic material so that their corner edge functions as cutting edge.

After the V-shaped notch reaches its maximum depth by means of the V-shaped notch forming die section, the portion of hoop extending beyond the position where the deepest notch has been formed is cut off from the main body of hoop while the latter is firmly held between both the upper and lower depressing die halves. As will be apparent from the above description, hoop on the lower V-shaped notch forming die half sinks together with the latter during cutting operation.

On completion of die opening thus obtained blank is kept still on the lower depressing die half and it is then thrusted forward by the next stroke of feeding of hoop. Thus, it is transferred to the next step of press working.

The U-bending die section is constructed in accordance with one of the first to third types of press working as described below. It is most preferable that the third type of press working is carried out for practicing the invention.

Firstly, the U-bending die section in accordance with the first type of press working includes a depressing die, a pair of upper cam dies, a male die and a pair of lower cam die.

Specifically, the depressing die is resiliently attached to the upper board of the die assembly with spring means interposed therebetween while it comes in sliding contact with the upper depressing die half of the cutting die section. The depressing die is immovably held in the laterial direction but can move by a short distance in the vertical direction (upwardly toward the upper board) against resilient force of spring means.

The upper cam dies are constructed in the form of a pair of blocks and fixedly secured to the upper board of the die assembly (or a mounting plate disposed below the latter) in the horizontal direction at a right angle relative to the direction of feeding of hoop against resilient force of spring means. Their oppositely located surface is formed with an inclined face at the lower end part thereof respectively which divergently extends in the downward direction (toward the lower board of the die assembly).

The male die is fixedly mounted on the lower board of the die assembly at the position located opposite to the depressing die and adjacent to the lower depressing die half. The male die includes a flat face portion flush with the upper surface of the depressing die half and arched convex portions (having the configuration of about one fourth of a full circle) at both the ends as seen in the horizontal direction at a right angle relative to the direction of feeding of hoop.

The lower cam dies are displaceably mounted on the lower board of the die assembly in the oppositely located relation with the male die interposed therebetween under the effect of pulling force which is exerted on them in the direction away from the male die. Each of the lower cam dies is formed with a recess on their oppositely located surface, the recess being located corresponding to the arched convex portion on the male die and having a radius of curvature dimensioned larger by the thickness of hoop (while having the configuration of about one fourth of a full circle). Further, it is formed with an inclined face on the opposite side to the recess, the inclined face being located in vertical alignment with the inclined face on the upper cam die and convergently extending in the upward direction (toward the upper board of the die assembly). As is apparent from the above description, the lower cam dies are displaceable in the horizontal direction at a right angle relative to the direction of feeding of hoop but they cannot move in any other direction due to the existence of components associated with them.

When a blank is transferred onto the male die and the die assembly is caused to close, the depressing die comes in abutment against blank and the latter is clamped between the depressing die and the male die so that bending to the U-shaped configuration is achieved at both the ends of blank as the pair of lower cam dies are closed with both the upper and lower cam dies coming in contact with one another. When the die assembly is opened, the lower cam dies resumes their original position under the effect of pulling force. As a result, U-bent blank is left on the male die.

Secondly, the U-bending die section in accordance with the second type of press working includes an oppositely pair of male and female dies. The female die is fixedly secured to the upper board of the die assembly at the position located adjacent to the upper depressing die half. It is formed with an U-shaped cavity on the lower surface thereof which is opened downwardly. The arched concave faces on the U-shaped cavity (having the configuration of about one fourth of a full circle) are dimensioned larger by the thickness of hoop than those on the male die to be described later.

The male die is fixedly mounted on the lower board of the die assembly at the position located opposite to the female die and adjacent to the lower depressing die half. The upper end part of the male die includes a flat face portion flush with the upper surface of the lower depressing die half and arched convex portions (having the configuration of about one fourth of a full circle) at both the ends as seen in the horizontal direction at a right angle relative to the direction of feeding of hoop from the flat face portion.

When blank is transferred onto the male die and the die assembly is caused to close, it is pressed by the male die to bend both the end parts of blank to the U-shaped configuration. U-bending operation is completed at a time when the male die is closely fitted to the female die. As the die assembly is opened, the female die is disengaged from the male die while the U-bent blank is left on the male die.

To prevent an occurrence of sector-shaped opening at the butting end of a press worked bush at a time when the U-bent blank is finally worked to the circular configuration until both the arched end parts thereof abut against one another, the U-bending die section in accordance with either of the first and second types of press working is formed with shoulders which divergently extend in the downward direction in order to taper both the ends of blank. The shoulders in the U-bending die section in accordance with the first type of press working are located in the recesses on the oppositely located surfaces of the lower cam dies. They may be located on both the arched ends of the male die. On the other hand, the shoulders in the U-bending die section in accordance with the second type of press working are located at both the outermost ends of the arched convex portions on the male die.

Finally, the U-bending die section in accordance with the third type of press working comprises a combination of U-bending die sections in accordance with both the first and second types of press working, wherein the U-bending die section in accordance with the first one is located upstream of the U-bending die section in accordance with the second one as seen in the direction of feeding of hoop.

In the case of the U-bending die section in accordance with the third type of press working there is no necessity for forming shoulders on the U-bending die section in accordance with the first type but those are required on the second type of press working.

An advantageous feature of the U-bending die section in accordance with the third type is described in the previous paragraph and another advantageous feature of the same is in that there does not occur such a malfunction that the position where blank is bent tends to be offset as will be seen in the U-bending die section in accordance with the second type of press working.

The circle bending die section which is arranged subsequent to the U-bending die section is generally constructed in accordance with either of the first and second types of press working. To practice the present invention it is preferable to employ the second types of press working.

The circle bending die section in accordance with the first type of press working includes a pair of upper cam dies, a pair of lower cam dies and a core pin.

Specifically, the upper cam dies are constructed in the form of a pair of blocks and fixedly secured to the upper board of the die assembly (or to a mounting plate disposed below the upper board) in the oppositely located relation in the horizontal direction at a right angle relative to the direction of feeding of hoop. Their oppositely located surface is formed with an inclined face at the lower end part thereof which divergently extends in the downward direction (toward the lower board of the die assembly). The upper cam dies may be designed in the same configuration as that of the upper cam dies constituting the U-bending die section. Accordingly, there is no necessity for preparing upper cam dies separately for both the U-bending and circle bending die sections. A single pair of upper cam dies may serve for them in common.

The lower cam dies are displaceably mounted on the lower board of the die assembly at the position located opposite to one another with the core pin interposed therebetween in the horizontal direction at a right angle relative to the direction of feeding of hoop under the effect of pulling force which is exerted on them in the direction away from the core pin. Each of the lower cam dies is formed with a recess on the oppositely located surface thereof, the recess having the semicircular configuration (arched configuration equal to one half of a full circle) of which radius of cuavature is determined larger by the thickness of hoop than the radius of the core pin. Further, it is formed with an inclined face on the opposite side to the aforesaid surface at the position located in vertical alignment with the inclined face on the upper cam die, the first-mentioned inclined face convergently extending in the upward direction (toward the upper board of the die assembly). As is apparent from the above description, the lower cam dies can move in the horizontal direction at a right angle relative to the direction of feeding of hoop but they are not displaceable in any other direction due to the existence of components associated with them. As will be readily understood from the above description, the lower cam dies function in the quitely same manner as the lower cam dies in the U-bending die section.

The core pin is fixed to the side wall of the male die at the upper end thereof and extends in the direction of feeding of hoop in such a manner that its peripheral surface is flush with the upper flat face of the male die. Thus, it projects in the axial direction in continuation from the upper flat face of the male die without any height difference therebetween.

On completion of U-bending operation blank is slidably displaced from the upper flat face of the male die onto the core pin by utilizing feeding movement of hoop. At this moment both the end parts of the U-bent blank are held in the predetermined feeding position while they come in contact with the semicircular recesses on the lower cam dies. As the die assembly is caused to close, both the upper and lower cam dies are brought in contact with one another and each of the lower cam dies moves toward the core pin whereby the U-bent end parts of blank are pressed on the latter to the circular configuration. As a result, a required press worked bush is produced. When the die assembly is opened, the lower cam dies resume their original position under the effect of pulling force. At this moment the circle bent bush is left on the core pin while it is fitted onto the latter.

Next, the circular bending die section in accordance with the second type of press working is constructed such that means for pressing this circle bent bush further in the vertical direction, that is, the direction oriented at a right angle relative to the direction of pressing in the first type of press working after displacement of the bush by the predetermined distance is added to the circle bending die section in accordance with the first type of press working. Namely, another circle bending die section including an upper circle bending die half, a lower circle bending die half and a core pin is arranged downstream of the circle bending die section in accordance with the first type of press working.

Specifically, the upper circle bending die half is formed with a semicircular recess (arched configuration equal to one half of a full circle) on the lower surface thereof of which radius of curvature is determined larger by the thickness of hoop than the radius of the core pin and fixedly secured to the upper board of the die assembly (or to a mounting plate disposed below the latter).

The lower circle bending die half is formed with a semicircular recess (arched configuration equal to one half of a full circle) on the upper surface thereof of which radius of curvature is determined larger by the thickness of hoop than the radius of the core pin and fixedly secured to the lower board of the die assembly.

The core pin comprises an extension from the core pin in the circle bending die section in accordance with the first type of press working.

A bush press worked in the circle bending die section in accordance with the first type of press working is slidably displaced to the predetermined position by feeding movement of hoop while it is fitted onto the core pin and the die assembly is then closed.

The upper and lower circle bending die halves press thus displaced bush on the pin core in the vertical direction.

Operational effect of pressing operation in the vertical direction is as described in the previous paragraph in which the method of the invention is dealt with.

When the die assembly is opened, the press worked bush is held still on the core pin while it is fitted thereon. As hoop is transferred, the bush is discharged out of the die assembly by thrusting movement of the subsequent work. Thus, a required press worked bush has been produced.

BRIEF DESCRIPTION OF THE DRAWINGS

The accompanying drawings will be briefly described below.

DESCRIPTION OF THE PREFERRED EMBODIMENTS

Now, the present invention will be described in a greater detail hereunder with reference to the accompanying drawings which illustrate preferred embodiments thereof.

Figure 1:
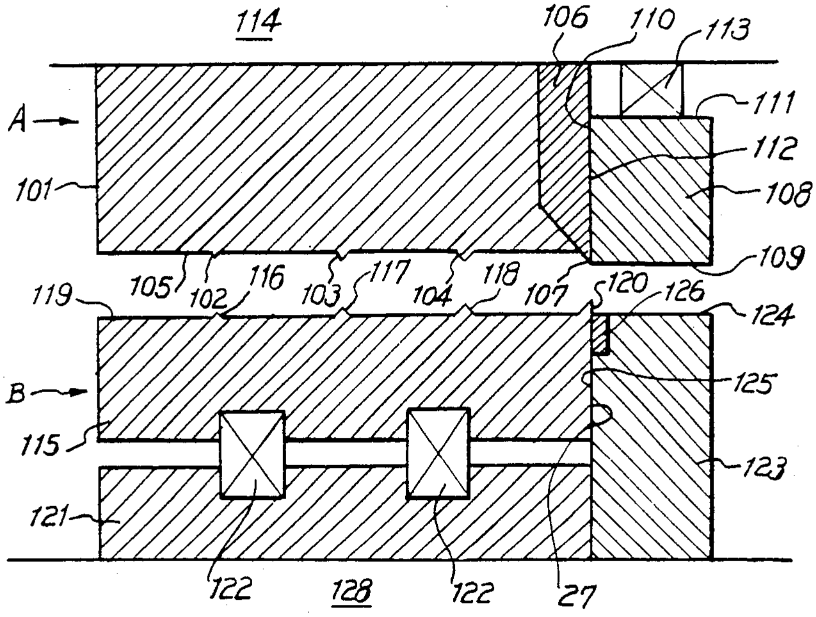
FIG. 1 is a vertical sectional view of a cutting die according to an embodiment of the invention, shown in the opened state.
Figure 2:
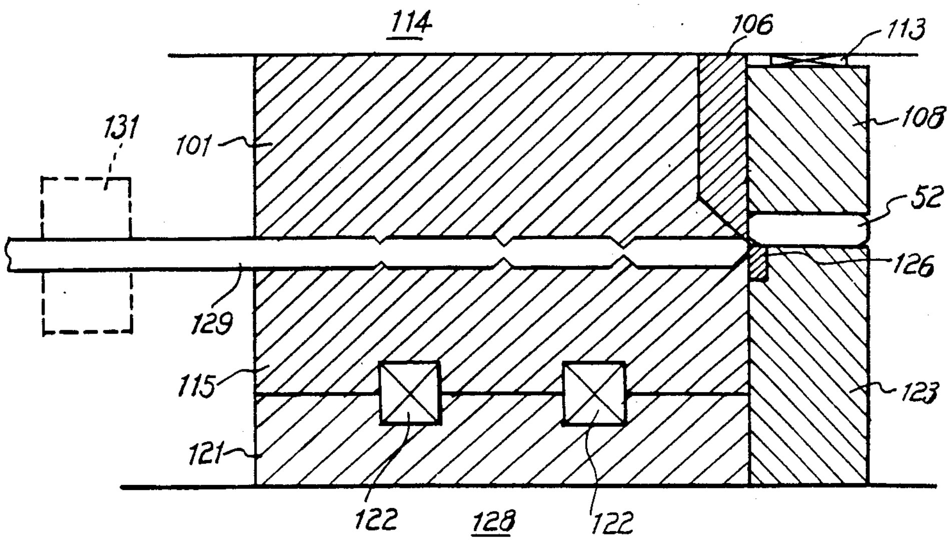
FIG. 2 is a vertical sectional view of the cutting die in FIG. 1 in the closed state, illustrating that hoop is cut off stepwise.

FIG. 1 is a vertical sectional view of a cutting die sectioned in the direction of feeding of hoop, wherein the cutting die is held in the opened state. FIG. 2 is a vertical sectional view of the cutting die similar to FIG. 1, illustrating that the cutting die is held in the closed state. In the drawings reference numeral 101 designates an upper die half for forming a plurality of V-shaped notches on the hoop and reference numerals 102, 103 and 104 designate a projection having the triangular cross-sectional configuration on the lower surface 105 of the upper die half 101 respectively. It should be noted that the projections 102, 103 and 104 are arranged in the equally spaced relation and have a stepwise increased height as seen from left to right in the drawings. Reference numeral 106 designates a cutting tool attached to the upper die half 101 and reference numeral 107 does a cutting edge on the lowermost end of the cutting tool 106. The cutting edge 107 is projected downwardly of the lower surface 105 at a distance equal to the height of the projection 104. The edge angle of the cutting edge 107 is determined to half of the vertical angle of the projections. The distance between the projection 104 and the cutting edge 107 is determined equal to the distance between the adjacent projections.

Reference numeral 108 designates an upper die half for depressing a part of the hoop, reference numeral 109 does the bottom surface of the upper die half 108, reference numeral 110 does the side surface of the same and reference numeral does the upper surface of the same.

Reference numeral 113 designates spring means made of urethane rubber which is disposed between the upper surface 111 of the upper die half 108 and the upper board 114 fixedly secured to a press machine.

The upper die half 108 comes in sliding contact with the side surface 112 of the cutting edge 106 along its side surface 110 and moves up and down together with the upper die half 101 having the cutting tool 106 attached thereto. However, once it abuts against the hoop, it carries out merely sliding movement relative to the upper die half 101.

Thus, an upper die section A is constituted by a combination of upper die half 101, cutting tool 106, upper die half 108 and spring means 113 and it is fixedly secured to press machine with the upper board 114 interposed therebetween. To assure that components constituting the upper die section A are kept in the required operative relation, it is provided with engaging means and fixing means but they are not shown in the drawings for the purpose of simplification of illustration.

Reference numeral 115 designates a lower die half for forming a plurality of V-shaped notches on the hoop and reference numerals 116, 117 and 118 designate a projection having the triangular cross-sectional configuration on the upper surface 119 of the lower die half 115 respectively. It should be also noted that they are arranged in the equally spaced relation and have a stepwise increased height as seen from left to right in the drawings. As is apparent from the drawings, the projections 116, 117 and 118 are located opposite to the projections 102, 103 and 104 on the upper die half 101 and have the same height as that of the oppositely located one.

Reference numeral 120 designates a guide projection which is located opposite to the cutting edge 107 of the upper cutting tool 106. The guide projection 120 has the same height as that of the projection 118 but it is designed in such a configuration that the right half of the latter is cut off. Obviously, the guide projection 120 is not intended to form V-shaped notches on the hoop 129 but functions to protect the one inclined face of a V-shaped notch while it is engaged thereto when the right end part of the hoop as seen in the drawings is cut off. In case where the hoop has a thin thickness, there is no necessity for any guide projection. Thus, the right end of the upper surface 119 of the lower die half 115 may be flat. In this case the upper surface 119 is flush with the upper surface of a lower depressing die half to be described later.

Reference numeral 121 designates a supporting plate and reference numeral 122 does spring means. The lower die half 115 is resiliently supported on the supporting plate 121 with the aid of spring means 122.

Reference numeral 123 designates a lower depressing die half, reference numeral 124 does an upper surface of the same, reference numeral 125 does a side surface of the same and reference numeral 126 does a lower cutting tool.

In the illustrated embodiment the lower cutting tool 126 is designed to have a cutting edge angle of 90 degrees and therefore its upper end face is flush with the upper surface 124 while its side face is flush with the side surface 125 of the lower die half 123.

The lower die half 123 is located opposite to the upper die half 108 and fixed directly or indirectly to the supporting plate 121. Further, the side surface 125 of the lower die half 123 comes in sliding contact with the side surface 127 of the lower die half 115.

Thus, a lower die section B is constituted by a combination of lower die half 115, supporting plate 121, spring means 122 and lower die half 123 with cutting tool 126 attached to the latter and it is fixedly secured to a press machine with the lower board 128 interposed therebetween. To assure that components constituting the lower die section B are kept in the required operative relation, it is provided with engaging means and fixing means but they are not shown in the drawings for the purpose of simplification of illustration.

As the feeding device 131 is operated, the hoop 129 is fed to the cutting die as constructed in the above-described manner at a predetermined distance from left to right as seen in the drawings. After the hoop 129 reaches the deepest V-shaped notch, it is brought onto the lower die half 123.

When die closing is initiated, the bottom surface 109 of the upper die half 108 is first brought in contact with the hoop 129 and then the spring means 113 becomes effective for depressing the hoop 129.

Cutting operation is initiated by means of both the cutting tools 107 and 126 at the same time when the hoop 129 is firmly held between both the die halves 108 and 123. As die clamping proceeds, the lower die half 115 is depressed by the upper die half 101 against resilient force of the spring means 122 with the hoop 129 held therebetween whereby the latter is cut off.

During the above-mentioned step pressing is simultaneously achieved on the hoop 129 to form a plurality of V-shaped notches having a predetermined depth.

On completion of cutting operation the lower die half 115 is restored to the original position under the effect of resilient force of the spring means 122 and the upper die half 108 is also restored to the original position under the effect of resilient force of the spring means 113 (also under the effect of dead weight of the upper die half 108 itself) whereby the operational position of both the upper and lower die halves in the die opened state is resumed.

Figure 15:
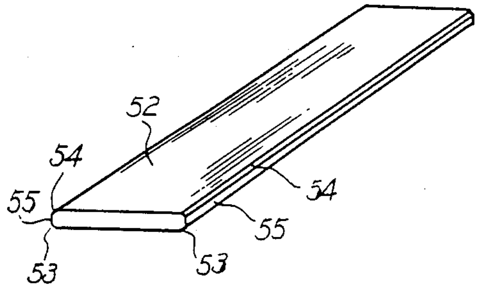
FIG. 15 is a perspective view of a blank of the invention having four corner edges chamfered.
Figure 16:
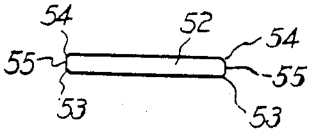
FIG. 16 is an enlarged end view of the blank in FIG. 15.

After completion of die opening the feeding device 131 is actuated to feed the loop 129 at a predetermined distance. Thus, a blank 52 which has been held on the lower die half 123 on completion of cutting operation is pushed out by the hoop 129. Now, the next die closing operation is ready to start in the same manner. The blank 52 is as illustrated in FIGS. 15 and 16. In the drawings to be described later reference numerals 53 and 54 designate a chamfered edge and reference numeral 55 does an end edge which is formed by cutting operation.

As will be readily understood from the above description, the cutting die of the invention makes it possible to automatically carry out cutting operations for a strip of metallic material (hoop) in cooperation with a feeding device without any necessity for manual handling during the whole step of cutting operation so as to form a lot of blanks having the required geometrical configuration without production of scrap or the like waste material.

Further, the cutting die of the invention makes it possible to feed thus produced blanks to the next station where a die assembly for bending blanks in the U-shaped or circle-shaped cross-sectional configuration is mounted in series to the cutting die, feeding of the blanks being carried out by utilizing feeding movement of the hoop in the cutting die, so that the next press working step is achieved at the same time as die clamping for forming V-shaped notches and cutting the hoop in the cutting die.

Next, a die assembly including the above-described cutting die will be described below with respect to a preferred embodiment of the invention.

In the illustrated embodiment the die assembly includes an U-bending die in accordance with the third type of press working in the U-bending step and a circle bending die in accordance with the second type of press working in the circle bending step.

Figure 3:
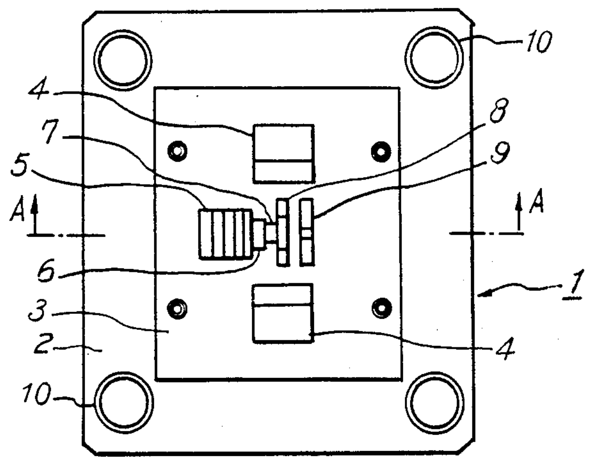
FIG. 3 is a plan view of an upper die section constituting the die assembly of the invention.
Figure 4:
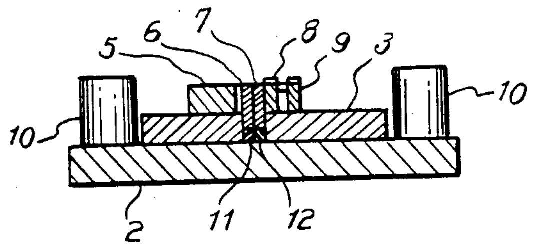
FIG. 4 is a vertical sectional view of the upper die section taken in line A—A in FIG. 3.

FIG. 3 is a plan view of the upper die section constituting the die assembly of the invention and FIG. 4 is a sectional view of the upper die section taken in line A—A in FIG. 3.

In the drawings reference numeral 1 designates an upper die section, reference numeral 2 does an upper die plate and reference numeral 3 does a mounting plate disposed on the upper die plate 2.

Reference numeral 4 designates a pair of upper cam dies located opposite to one another at a right angle relative to the direction of feeding of the hoop. As is apparent from the drawings, the upper cam dies 4 are arranged in the symmetrical relation with the essential part of the die assembly located therebetween.

Reference numeral 5 designates an upper V-shaped notch forming die and reference numeral 6 does an upper depressing die constituting the cutting die section.

Reference numeral 7 designates a depressing die constituting the U-bending die section and reference numeral 8 does a female die constituting the U-bending die section.

Reference numeral 9 designates an upper circle bending die constituting the circle bending die section and reference numeral 10 does a plurality of guide posts for guiding movement of both the upper and lower die halves. In the illustrated embodiment four guide posts 10 are arranged at the four corners of the upper die plate 2.

Reference numeral 11 designates spring means disposed between the upper die plate 2 and the upper depressing die 6 and reference numeral 12 does spring means disposed between the upper die plate 2 and the upper depressing die 7. In the illustrated embodiment the spring means 11 and 12 are made of rubber or the like material.

Figure 5:
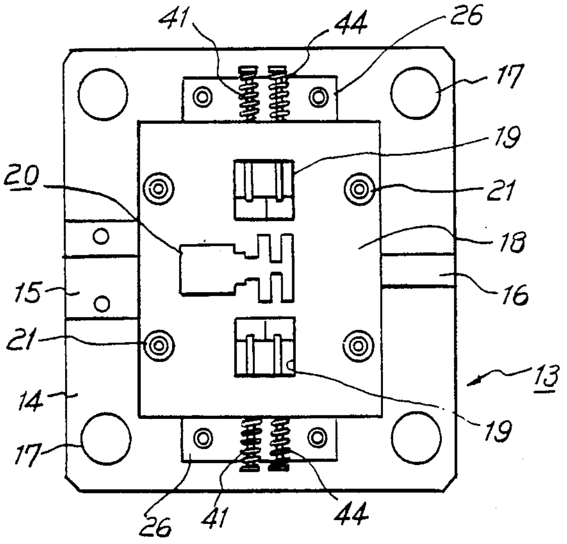
FIG. 5 is a plan view of a lower die section constituting the die assembly of the invention.

FIG. 5 is a plan view of the lower die section constituting the die assembly of the invention.

Reference numeral 13 designates a lower die section, reference numeral 14 does a lower die plate and reference numeral 15 does a guide block for the hoop. The guide block 15 is fixedly secured to the lower die plate 14. Reference numeral 16 designates a discharge groove for discharging bushes therethrough and reference numeral 17 does a plurality of guide posts.

The guide posts 17 are arranged at the four corners of the lower die plate and they are located in vertical alignment with the guide posts 10 on the upper die section.

Reference numeral 18 designates a guide plate fixedly secured to the lower die section 13 to cover the essential part of the latter, reference numeral 19 does a guide hole for guiding each of the upper cam dies 4 and reference numeral 20 does a guide hole for guiding the essential part of the upper die section comprising upper V-shaped notch forming die 5, upper depressing die 6, depressing die 7, female die 8 and upper circle bending die 9.

Figure 6:
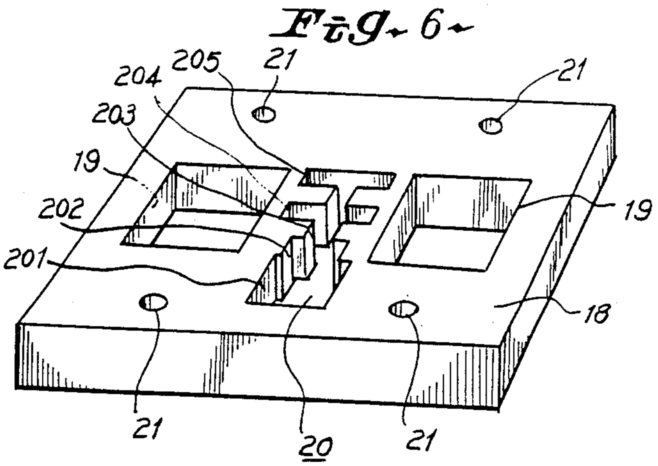
FIG. 6 is a perspective view of a guide plate constituting the die assembly of the invention, shown in an enlarged state.

FIG. 6 is a perspective view illustrating the guide plate 18 in the enlarged scale. As illustrated in the drawing, the guide hole 20 comprises a plurality of hole portion 201, 202, 203, 204 and 205 for guiding movement of the essential part of the upper die section 1.

Reference numeral 21 designates a plurality of bolt holes through which bolts are threadably inserted to secure the guide plate 18 to the lower die section.

Figure 7:
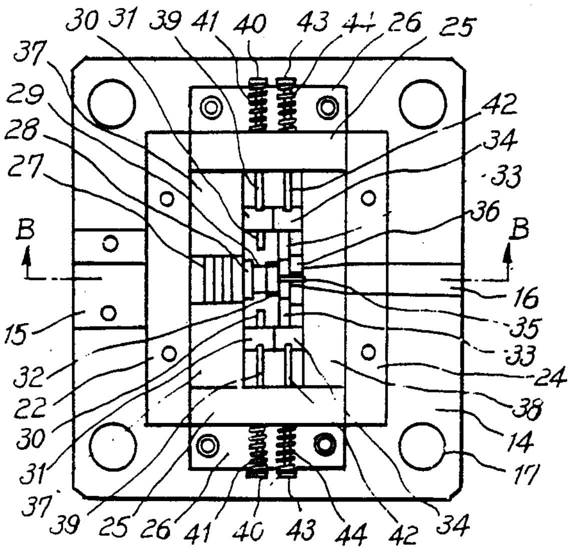
FIG. 7 is a plan view of a lower die section with the guide plate removed from the latter.
Figure 8:
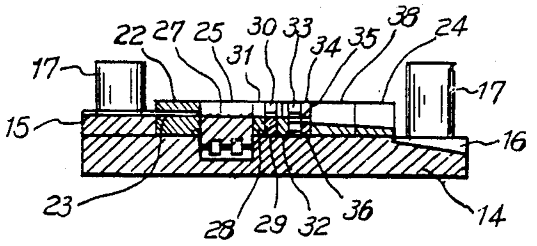
FIG. 8 is a vertical sectional view of the lower die section taken in line B—B in FIG. 7.

FIG. 7 is a plan view illustrating the lower die section with the guide plate 18 removed therefrom and FIG. 8 is a sectional view of the lower die section taken in line B—B in FIG. 7.

Reference numerals 22, 24 and 25 designate a frame respectively which is fixedly secured to the lower die plate 14 to constitute the lower die section, reference numeral 23 does a hole formed through the frame 22 to introduce the hoop into the interior of the die assembly and reference numeral 26 does a hook portion disposed on the frame 25. The hook portion 26 is intended to reinforce the frame 25 against back pressure transmitted from the upper cam dies 4.

Reference numeral 27 designates a lower V-shaped notch forming die, reference numeral 28 does a lower depressing die constituting the cutting die section, reference numeral 29 does a male die constituting the U-bending die section, reference numeral does a pair of lower cam dies with the male die 29 located therebetween and reference numeral 31 does an inclined portion constituting the back side of each of the cam dies 30. Reference numeral 32 designates a male die constituting the U-bending die section which is located opposite to the female die 8.

Reference numeral 33 designates a pair of lower cam dies constituting the circle bending die section and reference numeral 34 does an inclined portion constituting the back side of each of the cam dies 33.

Reference numeral 35 designate a core pin of which one end is fixedly secured to the male die 32. Reference numeral 36 designates a lower circle bending die which is located in vertical alignment with the upper circle bending die.

Reference numeral designates a block fixedly secured to the frame and reference numeral 38 does a block fixedly secured to the lower die plate. The blocks 37 and 38 serve to guide slidable movement of the movable components constituting the lower die section and reinforce the latter.

Reference numeral 39 designates a rod by way of which pulling force is transmitted to the cam die 30. The one end of the rod 39 is anchored at the inclined portion 31 of the cam die 30 and it extends outwardly through the frame 25 to carry a head 40 at the other end thereof. Reference numeral 40 designates a coil spring disposed between the frame 25 and the head 40.

Reference numeral 42 designates a rod by way of which pulling force is transmitted to the lower cam die 33, reference numeral 43 does a head of the rod 42 and reference numeral 44 does a coil spring.

Figure 9:
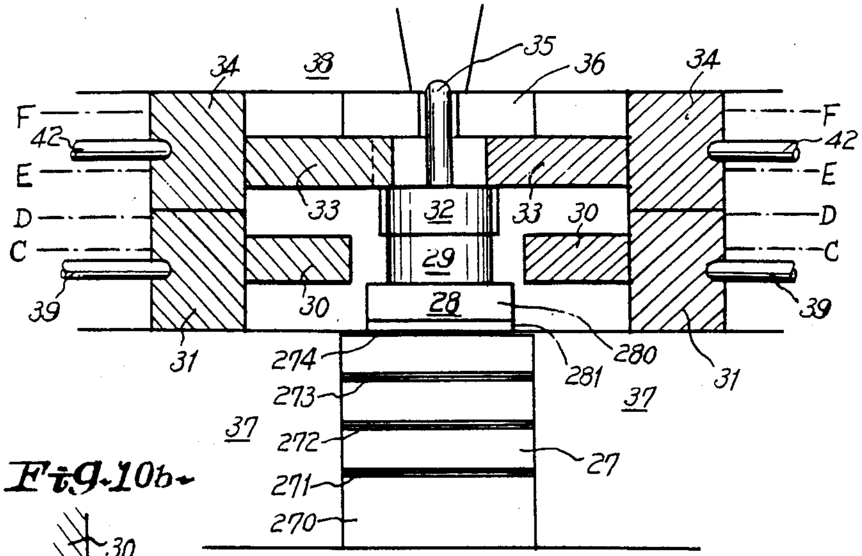
FIG. 9 is a fragmental plan view of the die assembly illustrating an essential part constituting the lower die section, shown in an enlarged state.

FIG. 9 is an enlarged plan view illustrating an essential part of the lower die section.

Reference numeral 270 designates an upper flat face portion on the lower V-shaped notch forming die 27 and reference numerals 271, 272 and 273 designate a projection having the triangular cross-sectional configuration on the flat face portion. The height of the projections 271, 272 and 273 is determined to stepwise increase in accordance with the order of reference numerals.

Reference numeral 274 designates a projection on the end of the flat face portion 270. The projection 274 has a cross-sectional configuration which is formed by cutting off the one half of the triangular cross-sectional configuration of other projections along a plane extending through the top thereof and its height is determined equal to that of the projection 273. The projection 274 does not function to form notches but functions as guiding means. In some case the projection 274 may be eliminated.

Reference numeral 280 designates an upper flat face portion on the lower depressing die 28 and reference numeral 281 does a lower cutting tool. The lower cutting tool 281 is integrally fitted to the lower depressing die 28 as described above. Its configuration may be designed flush with the flat face portion 280 of the depressing die. Alternatively, it may be designed in the form of a triangular cross-sectional configuration on the upper end edge where it comes in contact with the V-shaped notch forming die 27, the triangular cross-sectional configuration being formed in combination with the projection 274.

Figure 10B:
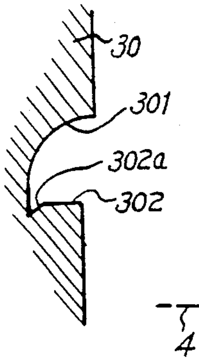
FIG. 10*b* is a fragmental vertical sectional view of the lower die section modified from that in FIG. 10*a*.
Figure 10A:
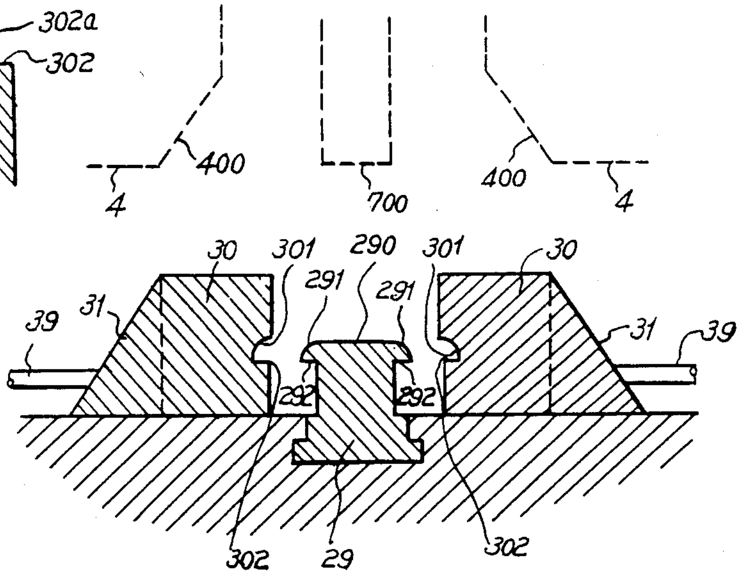
FIG. 10*a* is a fragmental vertical sectional view of the lower die section taken in line C—C in FIG. 9.

FIG. 10*a* is an enlarged vertical sectional view of the essential part of the lower die section taken in line C—C in FIG. 9. Reference numeral 290 designates an upper flat face of the male die 29. The upper flat face 290 of the male die 29 is flush with the flat face 280 of the lower depressing die 28. Reference numeral 291 designates an arched projection (having the configuration of one forth of a full circle) which constitutes continuation from the flat face 290 and reference numeral 292 does a flat face located below the arched projection 291.

Reference numeral 700 designates a lower end depressing face of the depressing die 7 and reference numeral 400 does an inclined face of the upper cam die.

As a blank (see FIG. 15) is transferred onto the flat face 290 of the male die 29, it is held between the depressing die 7 and the male 29 and die clamping is achieved with the pair of lower cam dies 30 displaced toward the male die 29. Even when the blank is offset leftwardly or rightwardly as seen in the drawings for any reason under the effect of resilient force of the spring means 12, the offset state is corrected by causing the lefthand or righthand end of the blank to come in abutment against the flat face 302 on the lower cam die. Thus, U-bending is effected correctly.

FIG. 10*b* is a fragmental sectional view of the lower die section modified from the embodiment as illustrated in FIG. 10*a*. According to the modified embodiment the lower cam die 30 is formed with an inclined face 302*a* in the boundary area between the flat face portion 302 and the arched recess portion 301 whereby a tapered face 56 is formed at each of the ends of the U-bent blank (see FIG. 18).

Figure 11:
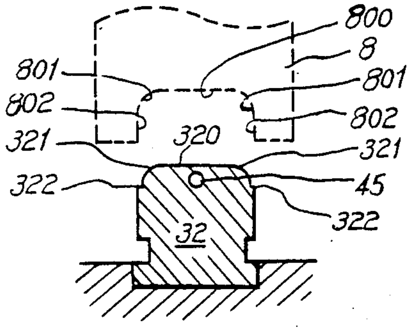
FIG. 11 is a fragmental vertical sectional view of the lower die section taken in line D—D in line 9.

FIG. 11 is an enlarged vertical sectional view of the lower die section taken in line D—D in FIG. 9. Reference numeral 45 designates a threaded hole into which the one end of the core pin 45 is threadably engaged and reference numeral 320 does an upper flat face portion of the male die 32. The upper flat face 320 of the male die 32 is located flush with the flat face 290 of the male die 29. Reference numeral 321 designates an arched convex portion (having the configuration of one forth of a full circle) which constitutes continuation from the flat face 320 and reference numeral 322 does an inclined face extending downwardly as seen in the drawing.

Reference numeral 800 designates a flat face portion of the female die 8, reference numeral 801 does an arched concave portion (having the configuration of one forth of a full circle) which constitutes continuation from the flat face portion 800 and reference numeral 802 does a vertically extending wall which constitutes continuation from the arched concave portion 801.

Figure 17:
FIG. 17 is an end view of a blank bent to the U-shaped configuration.
Figure 18:
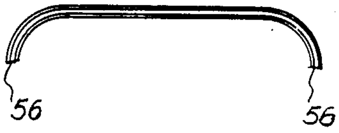
FIG. 18 is an end view of the U-bent blank having tapered ends.

When the U-bent blank (see FIG. 17) is transferred onto the male die 32 via the U-bending die as illustrated in FIG. 10*a*, both the ends of the U-bent blank are caused to abut against the inclined faces 322 whereby they are deformed to tapered configuration (as illustrated in FIG. 18).

The above-described steps of press working may be properly changed or modified as required. For instance, all the steps may be undertaken only by the step as illustrated in FIG. 10*a*. Alternatively, press working may be achieved by means of the die section as illustrated in FIG. 11 without the use of the step as illustrated in FIG. 10*a*. Alternatively, the die section as illustrated in FIG. 10*a* may be replaced with the die section as illustrated in FIG. 10*b* (in this case there is no necessity for the step of press working to be carried out using the die section as illustrated in FIG. 11).

Figure 12:
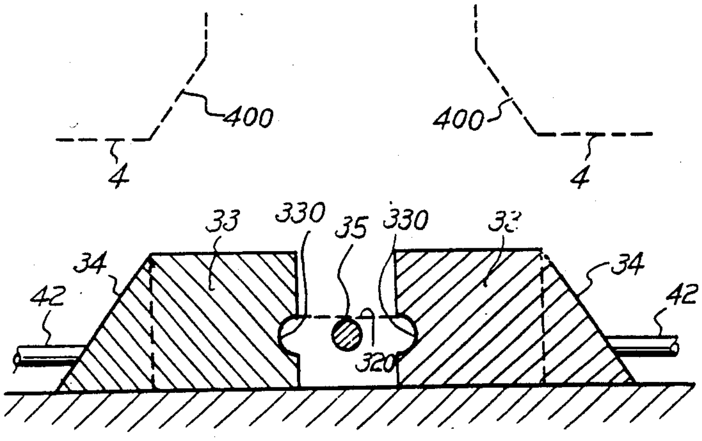
FIG. 12 is a fragmental vertical sectional view of the lower die section taken in line E—E in FIG. 9.

FIG. 12 is an enlarged vertical sectional view of the lower die section taken in line E—E in FIG. 9.

Reference numeral 330 designates a semicircular recess (having the configuration of one half of a circle) on the lower cam die. The core pin 35 extends horizontally in such a manner as to come in contact with the plane which constitutes continuation from the upper flat face 320 of the male die in the preceding step.

Figure 13:
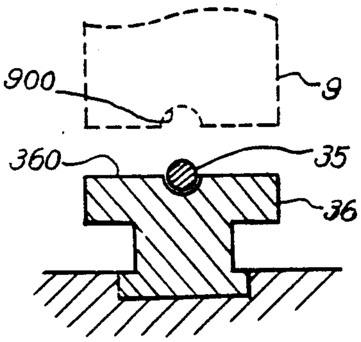
FIG. 13 is a fragmental vertical sectional view of the lower die section taken in line F—F in FIG. 9.

FIG. 13 is a vertical sectional view of the lower die section taken in line F—F in FIG. 9. Reference numeral 900 designates a semicircular recess (having the configuration of one half of a circle) on the upper circle bending die 9 and reference numeral 360 does a semicircular recess (having the configuration of one half of a circle) on the lower circle bending die 36.

The steps of circle bending as illustrated in FIGS. 12 and 13 may be undertaken merely by the step as illustrated in FIG. 12 with the step in FIG. 13 being eliminated.

Figure 14:
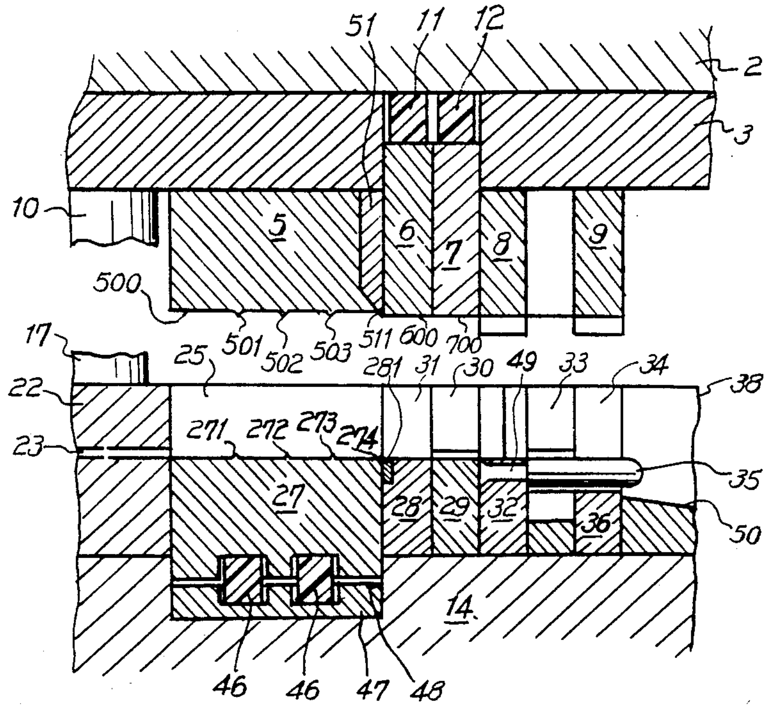
FIG. 14 is a vertical sectional view of the die assembly of the invention, illustrating that main components on the upper die section are located opposite to those on the lower die section.

FIG. 14 is a fragmental vertical sectional view of both the upper and lower die sections illustrating their main components in the oppositely located posture.

In the drawing reference numeral 46 designates spring means. In the illustrated embodiment the spring means 46 is constructed of rubber or the like elastic material.

Reference numeral 47 designates an anvil plate and reference numeral 48 does a gap between the lower V-shaped notch forming die 27 and the anvil plate 47. The notch forming die 27 can sink by a distance equal to the gap 48.

Reference numeral 49 designates a male thread portion on the core pin 35 and reference numeral 50 does an inclined groove on the block 38. The inclined groove 50 leads to the discharging groove 16 on the lower die plate 14.

Reference numeral 51 designates an upper cutting tool and reference numeral 511 does a cutting edge of the upper cutting tool 51. Reference numeral 500 designates a lower flat face on the upper V-shaped notch forming die and reference numerals 501, 502 and 503 designate a projection having the triangular cross-sectional configuration respectively. The projections 501, 502 and 503 have a height which is stepwise increased in accordance with the order of reference numerals. The cutting edge 511 of the upper cutting tool 51 is designed in such a configuration that one half of the projection having the triangular cross-sectional configuration is cut off along a plane extending upright on the flat face 500 to pass through the top thereof. The height of the cutting edge 511 as measured from the flat face 500 is determined equal to that of the projection 503.

It should of cource be understood that the cross-sectional configuration of the cutting edge should not be limited only to the illustrated one but no projection may be provided on the flat face 500. In this case the cutting edge is flush with the flat face 500 and the corner edge having a right angle functions as upper cutting edge.

Reference numeral 600 designates a lower depressing surface of the upper depressing die 6. The lower depressing surface 600 is located below the lower flat surface 500 of the upper V-shaped notch forming die. The extent of projection of the lower depressing surface 600 is determined equal to the height of the heighest projection 503 or appreciably more than the latter. The lower depressing surface 700 of the depressing die 7 is located at the same level as that of the depressing surface 600.

Next, description will be made below as to blank usable for carrying out the present invention as well as a press worked bush (hereinafter referred to simply as bush) made of this blank with reference to FIGS. 15 to 20. Among the drawings FIG. 15 is a perspective view of a blank having four corner edges chamfered and FIG. 16 is an end view of the blank in FIG. 15 as seen from the one side.

In the drawings reference numeral 52 designates a blank, reference numerals 53 and 54 do an inclined face at the corner edge of the blank 52 to be press worked to a bush later and reference numeral 55 does a flat end face extending at a right angle relative to the outer surface of the blank.

FIGS. 17 and 18 are a side view of U-bent blank respectively. In FIG. 18 reference numeral 56 designates a tapered face at each of both the ends of the U-bent blank. As described above, the tapered face 56 can be obtained by pressing the end part of the U-bent blank in FIG. 17 against the inclined face 322 on the male die 32 as illustrated in FIG. 11.

Figure 19:
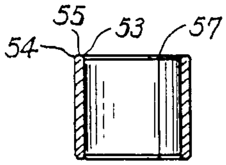
FIG. 19 is a vertical sectional view of a bearing in the form of a press worked bush.
Figure 20:
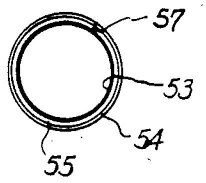
FIG. 20 is an end view of the bearing in FIG. 19.

FIG. 19 is a vertical sectional view of a bearing in the form of a bush which is produced by press working the U-bent blank in FIG. 18 and FIG. 20 is an end view of the bearing in FIG. 19 as seen from the one side.

In the drawings reference numeral 57 designates a butting end in the bearing. The butting end 57 is formed when both the tapered faces 56 are brought in close contact with one another.

As will be readily understood from the above description, the method of the invention makes it possible to automatically produce a lot of bearings in the form of a bush in operative association of actuating of press machine with feeding of hoop without any necessity for manual handling owing to the arrangement that all the steps of press working are located in series one after another in the direction of feeding of hoop without necessity for particular feeding device in each of the steps and thereby blanks are displaced from step to step merely by feeding movement of the hoop.

Further, the method of the invention has another advantageous features as follows.

1. no generation of material loss during transference of hoop and blank between the adjacent steps,
2. few wearing of die assembly without extremely high power exerted on the latter,
3. high accuracy of bearings as product,
4. excellent appearance of bearings as product,
5. inexpensive production of chamfered bearings merely by the steps of press working.

What is claimed is:

1. A cutting die for producing a lot of blanks usable for bearings in the form of a press worked bush, the bush being formed by feeding a hoop strip along its longitudinal axis and into the cutting die, each of said blanks including four chamfered corner edges each of which is constituted by one half of a V-shaped notch and two flat end faces extending between the adjacent corner edges at a right angle relative to the outer surface of the blank essentially comprising;

an upper board, an upper die section comprising an upper V-shaped notch forming die half having a lower surface with a plurality of projections having the triangular cross-sectional configuration formed on the lower surface thereon, said projections extending at a right angle relative to the direction of feeding of the hoop strip, an upper cutting tool having a side wall and attached to the upper notch forming die half, an upper depressing die half having an upper surface and disposed in slidable contact with the side wall of said upper cutting tool and spring means arranged between said upper board and the upper surface of said upper depressing die half, and a lower die section comprising a lower V-shaped notch forming die half having a side wall and an upper surface, said V-shaped notch forming die half being provided with a plurality of projections having the triangular cross-sectional configuration formed on the upper surface thereof, said projections being located opposite to the projections on the upper die section, a supporting plate adapted to operatively support said lower V-shaped notch forming die half with spring means interposed therebetween and a lower depressing die half disposed in slidable contact with the side wall of said lower V-shaped notch forming die half to guide movement of the latter with a lower cutting tool fixedly secured thereto at the position located opposite to said upper cutting tool, said lower depressing die half being located opposite to said upper depressing die half and the lower end part of the lower depressing die half being fixedly secured to said supporting plate.

2. A die assembly for producing a lot of bearings in the form of a press worked bush from a hoop strip fed along its axis into the die assembly by using blanks adapted to be employed for them, each of said blanks including four chamfered corner edges each of which is constituted by one half of a V-shaped notch and two flat end faces extending between the adjacent corner edges at a right angle relative to the outer surface of the blank essentially comprising, an upper board for the die assembly, a lower board for the die assembly, a V-shaped notch forming die section for forming a plurality of V-shaped notches on both the upper and lower surfaces of a hoop strip having a predetermined width, a cutting die section adjacent said notch forming die section for carrying out cutting operation at the joint area where the last V-shaped notch is finally pressed so as to obtain a blank, a U-bending die section to receive and bend the thus obtained blank to the U-shaped configuration, a circle bending die section to receive and bend the thus U-shaped blank to the circular configuration, said V-shaped notch forming die section comprising an upper notch forming die half, having a lower surface, attached to the upper board of the die assembly with a plurality of projections having the triangular cross-sectional configuration formed on the lower surface thereof, said projections extending at a right angle relative to the direction of feeding of the hoop strip and the height of the projections being determined to increase stepwise toward said cutting die section and a lower notch forming die half, having an upper surface, resiliently attached to the lower board of the die assembly with spring means interposed therebetween and with a plurality of projections having the triangular cross-sectional configuration formed on the upper surface thereof, said projections being located opposite to those on the upper notch forming die half and the height of the projections being determined to increase stepwise toward the cutting die section, said cutting die section comprising an upper cutting tool, an upper depressing die half, a lower depressing die and a lower cutting tool, the upper notch forming die half of the V-shaped notch forming die section having a fore end, said upper cutting tool adapted to cooperate with said lower cutting tool to sever the hoop strip into sections and being fixedly secured to the fore end of the upper notch forming die half of the V-shaped notch forming die section as seen in the direction of feeding of the hoop strip and having a cutting edge at the lower end thereof, said upper cutting tool resiliently disposed in sliding contact with the upper cutting tool with spring means interposed between the upper cutting tool and the upper board of the die assembly, said lower depressing die half, having an upper corner edge, disposed in sliding contact with the lower notch forming die half of the V-shaped notch forming die section at the position located opposite to the upper depressing die half, the lower part of the lower depressing die half being fixedly secured to the lower board of the die assembly, and said lower cutting tool being attached to the upper corner edge of the lower depressing die half where it comes in sliding contact with the lower notch forming die half.

3. A die assembly as defined in claim 2, wherein said U-bending die section in accordance with the first type of press working comprises a depressing die disposed in sliding contact with the upper depressing die half of the cutting die section with spring means disposed between the depressing die and the upper board of the die assembly, a pair of upper cam dies arranged in the horizontal direction at a right angle relative to the direction of feeding of the hoop with the depressing die interposed between said upper cam dies which are fixedly secured to the upper board of the die assembly, a male die disposed in sliding contact with the lower depressing die half of the cutting die section, said male die being located opposite to the depressing die, and a pair of lower cam dies arranged in the horizontal direction at a right angle relative to the direction of feeding of the hoop with the male die interposed between said lower cam dies of which oppositely located surfaces are formed with a recess respectively which is adapted to come in engagement to a projected part of the male die, each of said lower cam die being displaced away from the male die on the lower board of the die assembly under the effect of pulling force at the position located below the upper cam dies.

4. A die assembly as defined in claim 2, wherein said U-bending die section comprises a female die disposed in sliding contact with the upper depressing die half of the cutting die section, said female die being fixedly secured to the upper board of the die assembly, and a male die disposed adjacent to the lower depressing die half of the cutting die section in vertical alignment with the female die, said male die being fixedly secured to the lower board of the die assembly.

5. A die assembly as defined in claim 2, wherein said U-bending die section comprises a combination of the U-bending die section in accordance with the first type of press working and the U-bending die section in accordance with the second one both of which are located in series and operate in accordance with the order of the former first and the latter second.

6. A die assembly as defined in claim 2, wherein said circle bending die section in accordance with the first type of press working comprises a pair of upper cam dies arranged in the horizontal direction at a right angle relative to the direction of feeding of the hoop, said upper cam dies being fixedly secured to the upper board of the die assembly, a core pin of which one end is anchored at the male die in the U-bending die section, said core pin extending in the direction of feeding of the hoop, and a pair of lower cam dies arranged in the horizontal direction at a right angle relative to the direction of feeding of the hoop with the core pin interposed between said lower cam dies of which oppositely located surfaces are formed with a semicircular recess respectively which is adapted to come in engagement to the core pin, each of said lower cam dies being displaced away from the core pin on the lower board of the die assembly under the effect of pulling force at the position located below the upper cam dies.

7. A die assembly as defined in claim 2, wherein in addition to the components constituting the circle bending die section in accordance with the first type of press working said circle bending die section in accordance with the second type of press working includes an upper circle bending die half fixedly secured to the upper board of the die assembly and a lower circle bending die half fixedly secured to the lower board of the same both of which are located in vertical alignment with one another with an extension of the core pin interposed therebetween and both of which oppositely located surfaces are formed with a semicircular recess respectively which is adapted to move toward the core pin, said lower circle bending die half being disposed adjacent to the lower cam dies in the circle bending die section in accordance with the first type of press working.

* * * * *